(12) United States Patent
Asahi et al.

(10) Patent No.: US 7,326,142 B2
(45) Date of Patent: Feb. 5, 2008

(54) PARTITION STRUCTURE OF POWER TRAIN DEVICE

(75) Inventors: Masahiko Asahi, Tochigi-Chi (JP); Kazuhiro Ohzeki, Tochigi (JP); Hiroaki Kashiwazaki, Tochigi (JP); Noboru Higano, Tochigi (JP); Manabu Endo, Tochigi (JP); Takayuki Matsumoto, Tochigi (JP); Takuo Kimura, Tochigi (JP); Masahiro Kasahara, Tochigi (JP); Kenichi Shigekura, Tochigi (JP)

(73) Assignee: Tochigi Fuji Sangyo Kabushiki Kaisha, Tochigi-shi (JP)

( * ) Notice: Subject to any disclaimer, the term of this patent is extended or adjusted under 35 U.S.C. 154(b) by 156 days.

(21) Appl. No.: 11/123,402

(22) Filed: May 6, 2005

(65) Prior Publication Data

US 2006/0100053 A1    May 11, 2006

(30) Foreign Application Priority Data

May 7, 2004    (JP)    ............................. 2004-138469

(51) Int. Cl.
*F16H 57/04*    (2006.01)
(52) U.S. Cl. ..................................... 475/160
(58) Field of Classification Search ................ 475/160, 475/230, 248
See application file for complete search history.

(56) References Cited

U.S. PATENT DOCUMENTS

| | | | |
|---|---|---|---|
| 2,015,108 A | * | 9/1935 | Harper ...................... 184/11.1 |
| 4,476,953 A | | 10/1984 | Hiraiwa et al. |
| 4,480,493 A | * | 11/1984 | Takahashi ..................... 74/467 |
| 4,586,395 A | * | 5/1986 | Fukuchi et al. ............... 74/467 |
| 4,745,819 A | | 5/1988 | Kano et al. |
| 4,862,768 A | * | 9/1989 | Iwatsuki et al. .............. 475/86 |
| 5,083,478 A | * | 1/1992 | Hiraiwa ....................... 180/247 |
| 5,209,321 A | * | 5/1993 | Sado ........................... 180/248 |

FOREIGN PATENT DOCUMENTS

| | | |
|---|---|---|
| EP | 1 361 101 A1 | 11/2003 |
| JP | 6-107010 | 4/1994 |

\* cited by examiner

*Primary Examiner*—Ha D. Ho
(74) *Attorney, Agent, or Firm*—Morrison & Foerster LLP

(57) ABSTRACT

A partition structure of a power train device is provided with: a second differential coupled with an external first differential so as to receive a driving force input to the first differential; a case having a first end facing to the first differential, a second end opposed to the first end and a wall defining the case, the case rotatably housing the second differential and an oil for lubrication of the second differential; and a seal member disposed at the first end of the case and between the first differential and the second differential so as to prevent the oil in the case from mixing with an external fluid existing outside with respect to the case and the seal member.

16 Claims, 5 Drawing Sheets

PARTITION STRUCTURE OF POWER TRAIN DEVICE

BACKGROUND OF THE INVENTION

1. Field of the Invention

The present invention relates to a partition structure of a power train device applied to vehicles.

2. Description of the Related Art

There are proposed a variety of driving modes of vehicles and any of these driving modes are accomplished by appropriate selection and combination of power train elements such as various differentials, gears, couplings and transfers.

For example, a 4WD vehicle is essentially equipped with a combination of a transmission, a center differential, a transfer including a front (or rear) differential and a pinion gear coupled with a propshaft, and a rear (or front) differential coupled with the propshaft. The transmission receives and transmits a power generated by an engine to the center differential. The center differential differentially distributes the power to the front differential and the propshaft coupled with the rear differential. The front and rear differentials are respectively coupled with front and rear wheels via respective axles. Thereby the combination transmits and differentially distributes the power to the four driving wheels.

In certain cases, for ease of installation to the vehicle, the center differential, the front differential and the transfer are combined in a unit, as in a prior art disclosed in Japanese Patent Application Laid-open No. H06-107010.

SUMMARY OF THE INVENTION

The combined unit of the prior art might often give rise to a problem of lubrication. The reason is that the center differential is, in general, spatially linked with both the transmission and the transfer. Such a spatially linked structure leads to mixing oils respectively applied to the transmission and the transfer, though oils optimal to the transmission and the transfer differ from each other in some characteristics, particularly, in viscosity. A solution would be to apply a common oil having low viscosity and forcibly circulate the oil from the transmission to the transfer. However, the solution requires design consideration for both the transmission and the combined unit, which includes how to provide oil circulation paths and an oil pump for the both and how to link such constituted devices. This might lead to decrease in a freedom of design and ease of installation.

The present invention is intended for providing a partition structure of a power train device, which partitions spaces of a first differential and a second differential so as to enable application of respective lubrication oils to the first and second differentials.

According to an aspect of the present invention, a partition structure of a power train device is provided with: a second differential coupled with an external first differential so as to receive a driving force input to the first differential; a case having a first end facing to the first differential, a second end opposed to the first end and a wall defining the case, the case rotatably housing the second differential and an oil for lubrication of the second differential; and a seal member disposed at the first end of the case and between the first differential and the second differential so as to prevent the oil in the case from mixing with an external fluid existing outside with respect to the case and the seal member.

Preferably, the partition structure is further provided with: a first rotary member coupled with an external first output gear of the first differential, a second rotary member coupling an external second output gear of the first differential with an input member of the second differential, the second rotary member being disposed coaxially interior to the first rotary member; and an output member for output of the second differential, the output member being disposed coaxially interior to the second rotary member; wherein the seal member includes a first seal disposed between the case and the first rotary member, a second seal disposed between the first rotary member and the second rotary member and a third seal disposed between the second rotary member and the output member.

DETAILED DESCRIPTION OF THE PREFERRED EMBODIMENT

Throughout the present specification and claims, an axial direction is defined with respect to an axis of a differential and axles unless otherwise noted.

Figure 1:
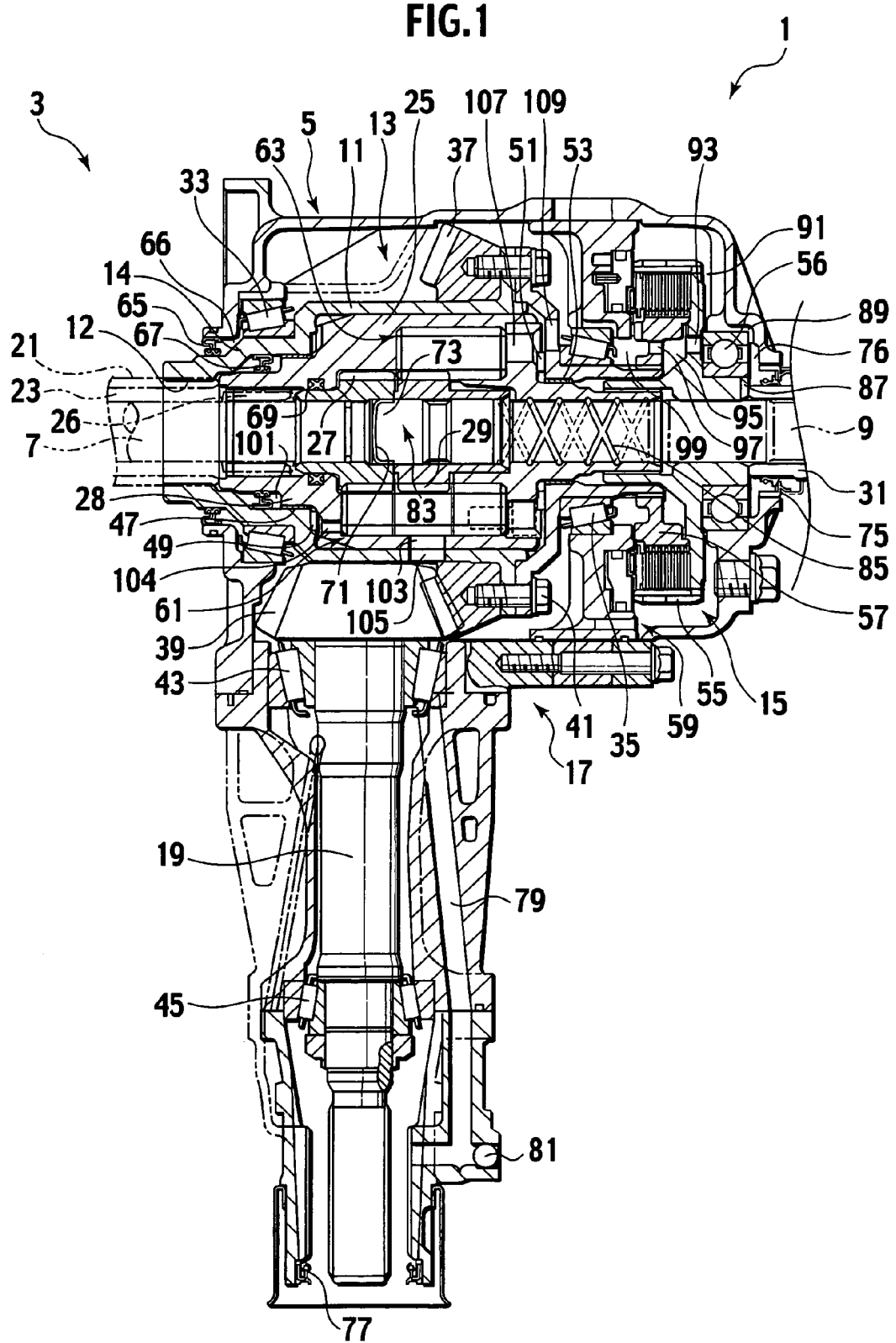
FIG. 1 is a sectional view of a transfer device having a partition structure according to a first embodiment of the present invention.

A first embodiment of the present invention will be described hereinafter with reference to FIG. 1.

According to the first embodiment, a partition structure 1 is applied to a transfer 3 (as a power train device). The transfer 3 receives a driving power generated by an engine via a center differential (as a first differential) and transmits the power to the four driving wheels.

The transfer 3 is provided with a transfer case 5, an outer casing 11 (as a first rotary member) rotatably housed in the transfer case 5, a front differential 13 (as a second differential) further rotatably housed in the outer casing 11, and seal members of a seal 65, a seal 67 and an X-ring 69 for sealing oil in the transfer case 5. The transfer case 5 is defined by a wall which is composed of a substantially cylindrical body, a first end (shown as a left end in FIG. 1) and a second end (shown as a right end in FIG. 1). The first and second ends respectively have first and second openings through which output and input members extend. The outer casing 11 and the front differential 13 are coupled with the center differential through the first opening of the first end. The seal 65, the seal 67 and the X-ring 69 are disposed around the first opening of the first end of the transfer case 5.

The front differential 13 is coaxially and rotatably housed in the outer casing 11. The front differential 13 is provided with a differential case 25 (as a second rotary member) and left and right side gears 27 and 29 for differential output to left and right axles. The outer casing 11 and the differential case 25 are respectively provided with a coupling portion 12 and a coupling portion 26 (i.e. both having splined inner peripheries) for coupling with side gears of the center differential and thereby respectively receive differential output power of the center differential.

The seal 65 is disposed between the transfer case 5 and the outer casing 11, particularly around the coupling portion 12. The seal 67 is disposed between the outer casing 11 and the differential case 25, particularly around the coupling portion 26. The X-ring 69 is disposed between the differential case 25 and the left side gear 27. As the seals 65 and 67, so-called oil seals having garter springs, which are generally used for sealing oil of rotary shafts, are preferably employed, however, any another type of seal members may be employed. In contrast, a usual X-ring, a type of squeeze packings, is preferably applied to the X-ring 69 since the differential case 25 may not severely rotate relative to the side gear 27, however, needless to say, the oil seals or any appropriate squeeze packings can be applied.

The side gear 27 is formed to be tubular and hence has a hollow 73 therein. The hollow 73 is sealed with a cap 71 as seal means. The cap 71 is directly and closely in contact with an internal periphery of the hollow 73, however, any gasket or a rubber mediate can be interposed therebetween. Alternatively, the side gear 27 may have a partition formed in a unitary body therewith so as to close a hollow.

The left and right side gears 27 and 29 are respectively provided with coupling portions for respectively coupling with left and right front axles 7 and 9, inside with respect to the seals 65 and 67 and the X-ring 69.

The seal 65, the seal 67 and the X-ring 69 are disposed with deviations from each other in the axial direction. The seal 65 is disposed substantially at the first end of the transfer case 5 and the seal 67 recedes relative to the seal 65 toward the inside of the transfer case 5. The X-ring 69 recedes relative to the seal 67 toward the inside and the cap 71 further recedes. Moreover, the coupling portions 12 and 26 and the coupling portion of the left side gear 27 are respectively disposed at inner peripheries of the seal 65, the seal 67 and the X-ring 69. Thereby, the coupling portions 12 and 26 and the coupling portion of the left side gear 27 can be disposed in a telescopic arrangement and recede toward the inside of the transfer case 25 in this order. Since the seal members and the coupling portions are radially and axially disposed as described above, diameters of the coupling portions 12 and 26 (in particular, 26) can be reduced as compared with a case where the seal members and the coupling portions are substantially aligned in the axial direction. This leads to reduction in peripheral speeds of the coupling portions and increase in thickness of the coupling portions and hence provides increase in durability of the seal members and increase in strength of the coupling portions.

The partition structure 1 is provided with oil circulation paths for circulation of the oil around the transfer case 5 and the front differential 13. The oil circulation paths include oil gutters formed on an inner periphery of the transfer case 5, which is configured to collect the oil splashed by centrifugal force of the front differential 13, and hence the oil circulation paths combined with the front differential 13 function as a centrifugal pump.

The second end of the transfer case 5 is in contact with an outer periphery and an axial end of a bearing 56. An oil flow path 89 is formed between the second end of the transfer case 5 and the bearing 56 in such a way that the oil flow path 89 partly penetrates these boundaries. A space 76 is enclosed by the transfer case 5, a seal 75, an outer periphery of a joint 31, an axial end of a clutch housing 55 and the bearing 56, and connects the oil flow path 89 with an oil flow path 87 formed at the axial end of the clutch housing 55. The oil flow path 87 links with a clearance between the clutch housing 55 and a right front axle 9 and further links with a clearance between the differential case 25 and the axle 9. Inner periphery of the differential case 25 has spiral grooves to form an oil flow path 85. The inner periphery of the side gear 29 and the outer periphery of the axle 9 are splined and thereby connected with each other but have a certain clearance to allow flow of the oil. The clearance links with an internal space 73 defined by side gears 27 and 29 and the cap 71. The differential case 25 is provided with an oil flow path 103 at the outer periphery and an oil flow path 107 at an axial end directed to the second end, both of which link with the internal space 73. The outer casing 11 is provided with an oil flow path 105 and an oil flow path 109 respectively correspondingly to the oil flow paths 103 and 107 of the differential case 25.

The clearances and the spaces described in the last paragraph compose a first oil circulation path of the oil circulation paths. The oil enclosed in the transfer case 5 to a predetermined amount flows through the first oil circulation path as the following manner. Given that the oil first exists in a space 91, the oil flows through the oil flow path 89 to the space 76 and reaches the oil flow path 87. The oil at the oil flow path 87 further flows through the clearances around the axle 9 and the oil flow path 85 to an interior of the differential case 25 and reaches the internal space 73. Accompanying rotation of the differential case 25, the oil in the internal space 73 spreads around and lubricates gear teeth and sliding surfaces of the side gears 27 and 29 and the pinion gears 61 and 63. The oil flows out of the oil flow paths 103 and 107 by means of the centrifugal force of the differential case 25 and further flows out of the oil flow paths 105 and 109. Then the oil returns to the space 91.

The clutch housing 55 (as a third rotary member) has a cylindrical portion projecting rightward, an inner periphery of which slidably mesh with an outer periphery of the differential case 25 so as to leave an inner clearance, and an outer periphery of which slidably mesh with an inner periphery of the outer casing 11 so as to leave an outer clearance. The inner and the outer clearances compose a part of a second oil circulation path. The inner clearance links with clearances around sliding bearings 51 and 53 and the outer clearance links with an oil flow path 95. The sliding bearings 51 and 53 spatially links with the oil flow path 109 of the outer casing 11. The oil flow path 95 links with an oil reservoir 99 via an oil flow path 97 penetrating a clutch hub 57. Both the oil flow path 109 and the oil reservoir 99 link with the space 91. The clearances, the oil flow path 95, the oil flow path 109, the oil flow path 97 and the oil reservoir 99 compose the second oil circulation path for circulating the oil to the space 91. The oil flowing into the inner clearance of the clutch housing 55, in one part, flows through the outer clearance, the oil flow path 95 and the oil flow path 97 and reaches the oil reservoir 99 to return to the space 91. The oil in another part flows through the clearance around the sliding bearings 51 and 53 and reaches the oil flow path 109 to return to the space 91.

A third oil circulation flow path branch off from the internal space 73 which composes a part of the first oil circulation path and goes through an oil flow path 104. The third oil circulation flow path further includes a space 101 and a clearance between the differential case 25 and the outer casing 11, which links the oil flow path 104 and the space 101. The oil branching off from the internal space 73 flows through the space 101, the clearance and the oil flow path 104 and then reaches the space 91.

Around a bearing 33 which supports a boss portion 14 of the outer casing 11, an oil flow path is formed similarly to the oil flow path 89 around the bearing 56. A space 66 enclosed by the seal 65, the bearing 33, the transfer case 5 and the outer casing 11, and links the oil flow path links with the space 91. The oil flows through the oil flow path to the space 66 and further returns to the space 91 therethrough by means of centrifugal force of rollers of the bearing 33.

Moreover, the oil is enclosed in the transfer case 5 to the predetermined amount enough that rollers or balls of the bearings 33, 35 and 56 are sufficiently immersed in the oil. Thereby effective lubrication can be assured.

A drive train system of a 4WD vehicle employing the transfer 3 is provided with the engine, a transmission, a center differential for differentially distributing the driving force of the engine to the front wheels and the rear wheels, which is housed in a transmission case, the transfer 3, the front differential 13 for differentially distributing the distributed driving force to the left and right front wheels, which is housed in the transfer case 5, the left and right front axles 7 and 9, the left and right front wheels, a propeller shaft coupled with the rear wheels, a rear differential for differentially distributing the distributed driving power to the left and right wheels, the left and right axles, and the left and right wheels.

A transmission oil is enclosed in the transmission case, whereas a transfer oil being different in characteristic from the transmission oil is enclosed in the transfer case.

The transfer 3 is provided with the outer casing 11, the differential case 25, the multiple disc clutch 15 for limiting the differential motion, a skew gearing assembly 17 and a drive pinion shaft 19. The drive pinion shaft 19 is coupled with the propeller shaft.

The transmission receives the driving force generated by the engine, and changes speed thereof and further transmits the driving force to the center differential. The center differential differentially distributes the power to a member 21 and a member 23 coaxially and rotatably disposed. The member 21 has splines on the outer periphery so as to be coupled with the outer casing 11, thereby the distributed driving force is transmitted to the drive pinion shaft 19 and hence further to the rear differential. The rear differential differentially distributes the driving force to the left and right rear wheels. The member 23 also has splines so as to be coupled with the differential case 25, thereby the distributed driving force is transmitted to the front differential 13 via the differential case 25. The front differential 13 differentially distributes the distributed driving force to the left and right side gears 27 and 29. The left side gear 27 having splines is coupled with the left front axle 7. The axle 7 is coupled with a uniform motion universal joint linking with the left front wheel. The right side gear 27 is similarly coupled with the right front wheel via the right front axle 9 and the right joint 31. Thereby the distributed driving force is respectively transmitted to the left and right wheels.

The outer casing 11 is supported by the transfer 5 via the bearings 33 and 35. The skew gearing assembly 17 is composed of a pair of bevel gears 37 and 39. The bevel gear 37 is fixed to an outer periphery of the outer casing 11 by means of bolts 41 so as to rotate with the outer casing 11. The bevel gear 39 is formed at a front end of the drive pinion shaft 19. The drive pinion shaft 19 is supported by the transfer case 5 via the thrust bearings 43 and 45 and coupled with the rear differential via a coupler, the propeller shaft and further a coupler.

The differential case 25 is rotatably supported in the inner periphery of the outer casing 11 via sliding bearings 47 and 49 and the sliding bearings 51 and 53. The sliding bearing 47 is disposed around a boss portion 28 of the differential case 25 and the sliding bearing 49 is disposed to the right of the bearing 47. The sliding bearings 47 and 53 regulate a radial disposition of the outer casing 11 and the differential case 25 with respect to the transfer case 5. The sliding bearings 49 and 51 regulate an axial disposition of the outer casing 11 and the differential case 25 with respect to the transfer case 5. The sliding bearing 47 does not overlap the sliding bearing 49 in both the axial direction and the radial direction. Similarly, the sliding bearing 51 does not overlap the sliding bearing 53 in both the axial direction and the radial direction. Since the differential case 25 is such disposed in the axial and radial directions by means of the sliding bearings, the differential case 25 can be formed in a compact constitution and support of the outer casing 11 and the front differential 13 is assured.

The multiple disc clutch 15 is disposed between the clutch housing 55 and the clutch hub 57. The clutch housing 55 and the differential case 25 are splined so as to connect with each other and integrally rotate. The clutch housing 55 and the differential case 25 are supported by the transfer case 5 via the ball bearing 56. The clutch hub 57 has the other splines for connection with the outer casing 11. The multiple disc clutch 15 actuated by a hydraulic actuator 59 limits the differential motion between the outer casing 11 and the differential case 25. The hydraulic actuator 59 is driven by an oil pump installed on a rotary shaft driven by the engine.

The front differential 13 is provided with the differential case 25, the side gears 27 and 29, and longer and shorter pinion gears 61 and 63. The differential case 25 has housings for rotatably housing the pinion gears 61 and 63. The longer and shorter pinion gear 61 and 63 mesh with each other. Further, the longer pinion gears 61 mesh with the left side gear 27 and the shorter pinion gears 63 mesh with the right side gear 29. Engagement between the pinion gears 61 and 63 and the side gears 27 and 29 causes force acting on the pinion gears 61 and 63 toward the respective housings and hence leads to a frictional force between the pinion gears 61 and the 63 and the respective housings. The front differential 13 utilizes the frictional force to accomplish torque-sensitive limited differential motion.

As described above, the seal 65, the seal 67 and the X-ring 69 are disposed at the first end of the transfer case 5 so as to prevent the transfer oil from mixing with the transmission oil existing at the center differential side. Furthermore, the seal 65, the seal 67 and the X-ring 69 are disposed with deviations from each other in the axial direction. A seal 75 is disposed between the transfer case 5 and the joint 31 at the right end of the transfer case 5. A seal 77 is disposed between the drive pinion shaft 19 and the coupler. The seals 75 and 77 prevent the oil from leaking out of the transfer case 5 and intrusion of alien substances into the transfer case 5.

The transfer oil is filled through a filler opening formed on the transfer case 5. The transfer case 5 is further provided with an oil flow path 79 along the drive pinion shaft 19, which is configured to conduct the oil in the space 91 to a space around the pinion shaft 19 in the vicinity of the seal 77. The oil flow path 79 has a through hole opening outward formed when machining and the through hole is sealed with a ball 81. Oil gutters are formed around the front differential 13 for receiving and conducting the oil.

According to the partition structure 1 of the present embodiment, the seal members of the seals 65 and 67 and X-ring 69 prevent the oil in the case from mixing with the transmission oil existing at the center differential side and are disposed to get together around the first end of the transfer case 5. Thereby, a large internal space can be assured in the transfer case 5 and hence a sufficient amount of special oil can be filled therein. This leads to increase in durability and realizes an enclosed system of the oil circulation in the transfer case.

Moreover, the partition structure 1 provides spatial separability of the power train device so that the transfer including the front differential can be separately and independently designed from the transmission including the center differential.

Meshing portions of the gears contained in the transfer 3 can be effectively lubricated by the circulating oil since the oil circulation paths are assured in such a way as to include all the meshing portions.

Moreover, the side gear 27 can be formed in a lightweight body having a cavity therein and can be reliably sealed by means of the seal member (the cap 71).

Further, according to the partition structure 1 of the present embodiment, the oil circulation paths respectively have centrifugal pump functions and thereby the oil is collected and conducted through the oil gutter to necessary points.

Figure 2:
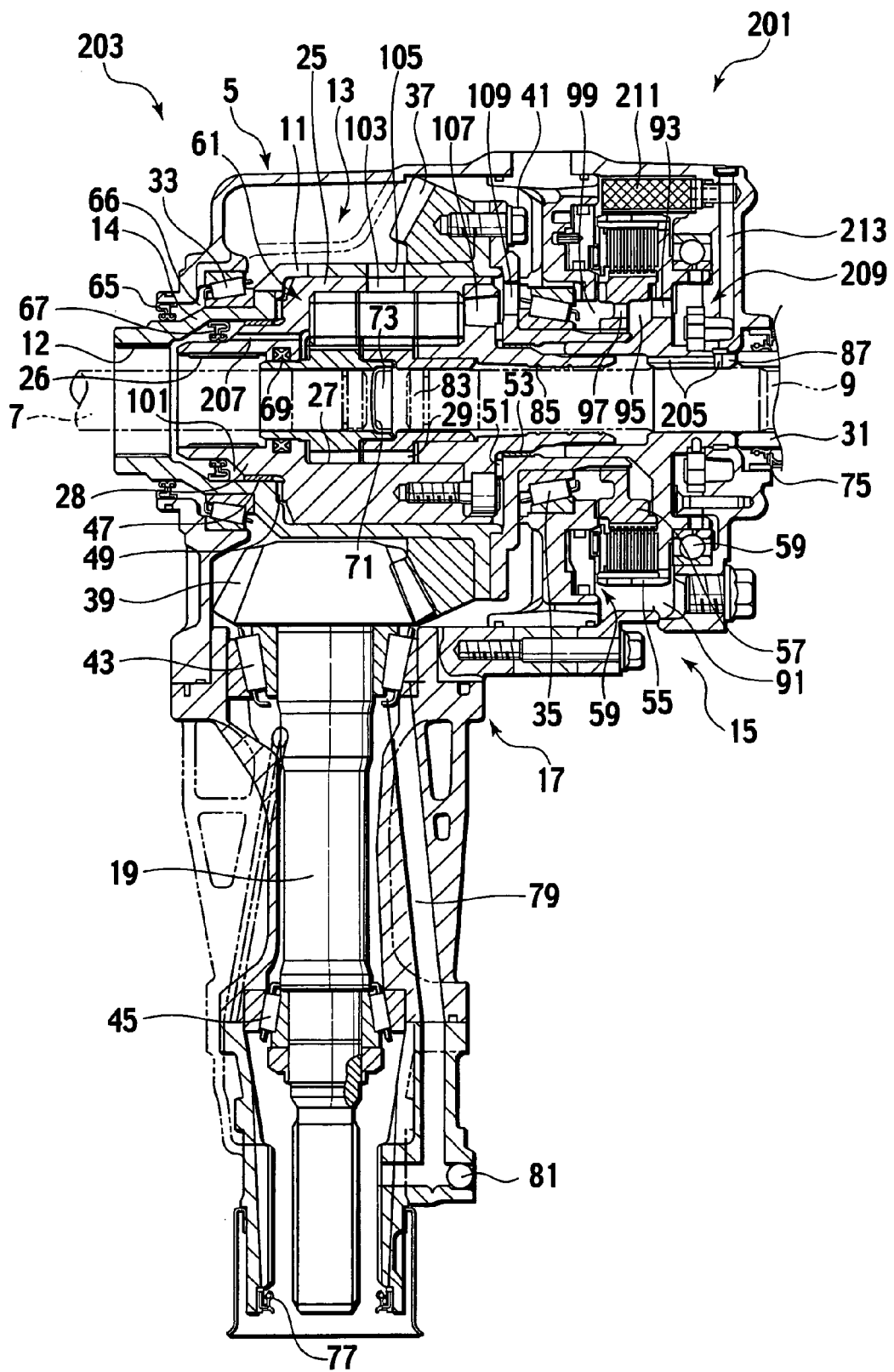
FIG. 2 is a sectional view of a transfer device having a partition structure according to a second embodiment of the present invention.

A second embodiment of the present invention will be described hereinafter with reference to FIG. 2. In the following description, substantially the same elements as any of the aforementioned elements are referenced with the same numerals and the detailed descriptions will be omitted.

According to the second embodiment, a partition structure 201 is applied to a transfer 203 (as a power train device). The transfer 203 receives a driving power generated by an engine via a center differential (as a first differential) and transmits the power to the four driving wheels.

The transfer 203 is provided with a transfer case 5, an outer casing 11 (as a first rotary member) rotatably housed in the transfer case 5, a front differential 13 (as a second differential) further rotatably housed in the outer casing 11, and seal members of a seal 65, a seal 67 and an X-ring 69 for sealing oil in the transfer case 5. The outer casing 11 and the front differential 13 are coupled with the center differential through the first opening of the first end. The seal 65, the seal 67 and the X-ring 69 are disposed around the first opening of the first end of the transfer case 5.

The left and right side gears 27 and 29 are formed to be tubular and hence respectively have hollows 73 and 83 therein. The hollow 73 of the side gear 27 is sealed with a cap 71 as seal means. Alternatively, the side gear 27 may have a partition formed in a unitary body therewith so as to close a hollow.

The partition structure 201 is provided with oil circulation paths configured similarly to the aforementioned partition structure 1 of the first embodiment. The oil circulation paths include an oil gutter, which is configured to collect the oil spread by centrifugal force. As one of points differing from the first embodiment, the oil circulation paths of the partition structure 201 further include an oil flow path 207 formed in the differential case 25. The oil flow path 207 links the interior of the differential case 25 with a space substantially enclosed by the outer casing 11, the differential case 25 and the seal 67 and runs along the axial direction of the differential case 25.

The partition structure 201 is further provided with a trochoidal pump 209, an oil filter 211 disposed at a bottom of the transfer case 5 and an oil flow path 213. The oil flow path 213 is a duct formed in the wall of the transfer case 203 at the second end and links the oil filter 211 with the vicinity of the axial center of the transfer case 203, which links with the oil flow path 87. The oil around the oil filter 211 is sent through the oil flow path 213 toward the oil flow path 87 by means of the trochoidal pump 209. The oil flow path 87 further links with an oil flow path 205 formed at the vicinity of the inner periphery of the clutch housing 55.

The transfer oil in the hollows 73 and 83 of the left and right side gears 27 and 29 sealed by the cap 71 moves rightward through the oil flow path 205 by a pumping function of the spiral grooves of the oil flow path 85. The oil receives centrifugal force to move through the oil flow paths 87, 93, 95, 97 and 99 to the oil gutter. The oil drops from a plurality of dropping port of the oil gutter to respective parts to be lubricated. In particular, in a case where the front differential 13 is in a static state, the oil flows from the space 101 through the oil flow path 207, the oil flow paths 103 and 105 into the front differential 13. Then the respective members are lubricated with the oil.

The transfer oil in the hollows 73 and 83 spreads to meshing portion between the side gears 27 and 29 and the pinion gears 61 and 63, and sliding portions between the pinion gears 61 and 63 and the respective housings, accompanying rotation of the differential case 25, and then these members are lubricated. The oil flows out of the oil flow paths 103 and 107 by means of the centrifugal force of the differential case 25 and further flows out of the oil flowpaths 105 and 109. Then the oil returns to the oil gutter.

According to the partition structure 201 of the present embodiment, the seal members of the seals 65 and 67, X-ring 69 and the cap 71 prevent the oil in the case from mixing with the transmission oil existing at the center differential side. Further, the oil circulation paths have a pumping function by employing the centrifugal force thereof and thereby the respective members can be effectively lubricated.

Moreover, the partition structure 201 provides spatial separability of the power train device so that the transfer including the front differential can be separately and independently designed from the transmission including the center differential.

Meshing portions of the gears contained in the transfer 203 can be effectively lubricated by the circulating oil since the oil circulation paths are assured in such a way as to include all the meshing portions. This leads to increase in durability.

Moreover, since the partition structure 201 employs the trochoidal pump 209, the aforementioned oil circulation is further assured.

Figure 3:
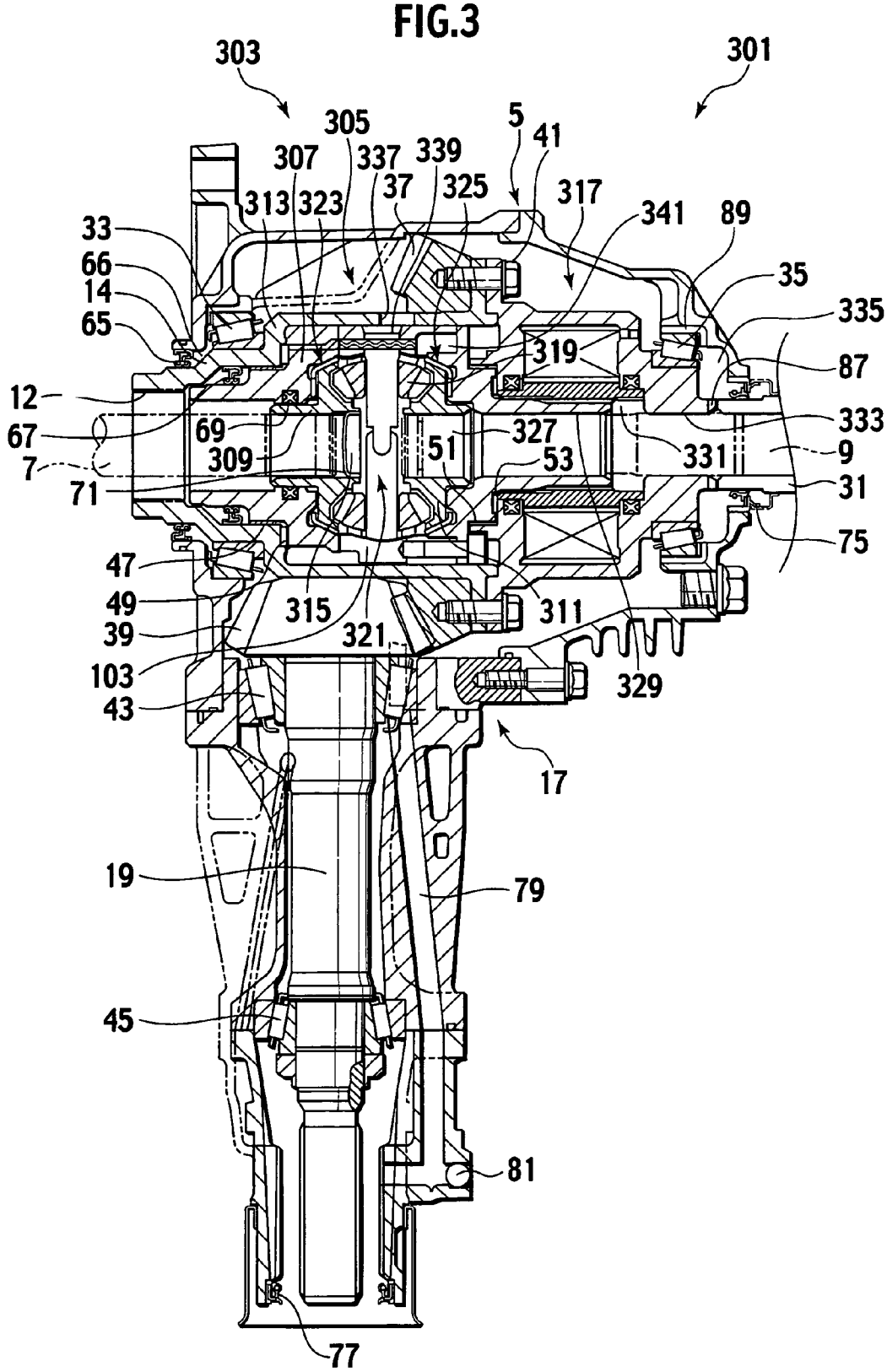
FIG. 3 is a sectional view of a transfer device having a partition structure according to a third embodiment of the present invention.

A third embodiment of the present invention will be described hereinafter with reference to FIG. 3. In the following description, substantially the same elements as any of the aforementioned elements are referenced with the same numerals and the detailed descriptions will be omitted.

According to the third embodiment, a partition structure 301 is applied to a transfer 303 (as a power train device). The transfer 303 receives a driving power generated by an engine via a center differential (as a first differential) and transmits the power to the four driving wheels.

The transfer 303 is provided with a transfer case 5, an outer casing 313 (as a first rotary member) rotatably housed in the transfer case 5, a front differential 305 (as a second differential) further rotatably housed in the outer casing 313, and seal members of a seal 65, a seal 67 and an X-ring 69 for sealing oil in the transfer case 5. The outer casing 313 and the front differential 305 are coupled with the center differential through the first opening of the first end. The seal 65, the seal 67 and the X-ring 69 are disposed around the first opening of the first end of the transfer case 5.

The partition structure 301 is provided with an oil gutter, which is configured to collect the oil splashed by centrifugal force of the front differential 305, and oil flow paths 315, 329, 331, 333, 335, 337, 339 and 341 having a function of a centrifugal pump.

The front differential 305 is coaxially and rotatably housed in the outer casing 313. The front differential 305 is provided with a differential case 307 (as a second rotary member) and left and right tubular side gears 309 and 311 for differential output to left and right axles.

The seal 65 is disposed between the transfer case 5 and the outer casing 313. The seal 67 is disposed between the outer casing 313 and the differential case 307. The X-ring 69 is disposed between the differential case 307 and the left side gear 309. A hollow 315 of the side gear 309 is sealed with a cap 71 as seal means.

The transfer 303 is provided with the outer casing 313, the front differential 305, a coupling 317 for speed-sensitive limitation of the differential motion thereof, a skew gearing assembly 17 and a drive pinion shaft 19.

The transmission receives the driving force generated by the engine, and changes speed thereof and further transmits the driving force to the center differential. The center differential differentially distributes the power to a member 21 and a member 23 coaxially and rotatably disposed. The member 21 has splines on the outer periphery so as to be coupled with the outer casing 313, thereby the distributed driving force is transmitted to the drive pinion shaft 19 and hence further to the rear differential. The rear differential differentially distributes the driving force to the left and right rear wheels. The member 23 also has splines so as to be coupled with the differential case 307, thereby the distributed driving force is transmitted to the front differential 13 via the differential case 307. The front differential 305 differentially distributes the distributed driving force to the left and right side gears 309 and 311. The left side gear 309 having splines is coupled with the left front axle 7. The axle 7 is coupled with a uniform motion universal joint linking with the left front wheel. The right side gear 311 is similarly coupled with the right front wheel via the right front axle 9 and the right joint 31. Thereby the distributed driving force is respectively transmitted to the left and right wheels.

The outer casing 313 is supported by the transfer 5 via the bearings 33 and 35. The differential case 307 is rotatably supported in the inner periphery of the outer casing 313 via sliding bearings 47 and 49 and the sliding bearings 51 and 53. The sliding bearings 47 and 53 regulate a radial disposition of the outer casing 313 and the differential case 307 with respect to the transfer case 5. The sliding bearings 49 and 51 regulate an axial disposition of the outer casing 313 and the differential case 307 with respect to the transfer case 5. The sliding bearing 47 does not overlap the sliding bearing 49 in both the axial direction and the radial direction. Similarly, the sliding bearing 51 does not overlap the sliding bearing 53 in both the axial direction and the radial direction.

The speed-sensitive coupling 317 is disposed between the outer casing 313 and the differential case 307. The speed-sensitive coupling 317 employs shearing resistance of a viscous fluid filled therein to limit the differential motion between the outer casing 313 and the differential case 307.

The front differential 305 is provided with the differential case 307, the side gears 309 and 311, pinion gears 319 meshing with the side gears 309 and 311, pinion shafts 321 being fixed to the differential case 307 and rotatably supporting the pinion gears 319, a pair of cone clutches 323 and 325 formed between the differential case 307 and the side gears 309 and 311. The cone clutches 323 and 325 receive engagement force generated by engagement between the pinion gears 319 and the side gears 309 and 311 and hence frictionally limit the differential motion of the front differential 305. Thereby the torque-sensitive differential limitation function is accomplished.

A space substantially enclosed by the cap 71, the hollow 73 and the hollow 327 houses the transfer oil. Accompanying rotation of the differential case 307, the transfer oil therein flows through oil flow paths 329, 331, 333 formed at inner peripheries of the right side gear 311 and the outer casing 313. The oil receives centrifugal force to flow through an oil flow path 335 at a right end in the transfer case 5 and the thrust bearing 35 to the oil gutter. The oil drops from a plurality of dropping port of the oil gutter to respective parts to be lubricated. In particular, in a case where the front differential 305 is in a static state, the oil flows through an oil flow path 337 formed in the outer casing 313, oil flow paths 339 and 341 formed in the differential case 307 into the front differential 305. Then meshing portions of the gears 309, 311, 319 and the cone clutches 323 and 325 are lubricated with the oil.

According to the partition structure 301 of the present embodiment, the seal members of the seals 65 and 67, X-ring 69 and the cap 71 prevent the oil in the case from mixing with the transmission oil existing at the center differential side. Further, the oil circulation paths have a pumping function by employing the centrifugal force thereof and thereby the respective members can be effectively lubricated.

Moreover, the partition structure 301 provides spatial separability of the power train device so that the transfer including the front differential can be separately and independently designed from the transmission including the center differential.

Figure 4:
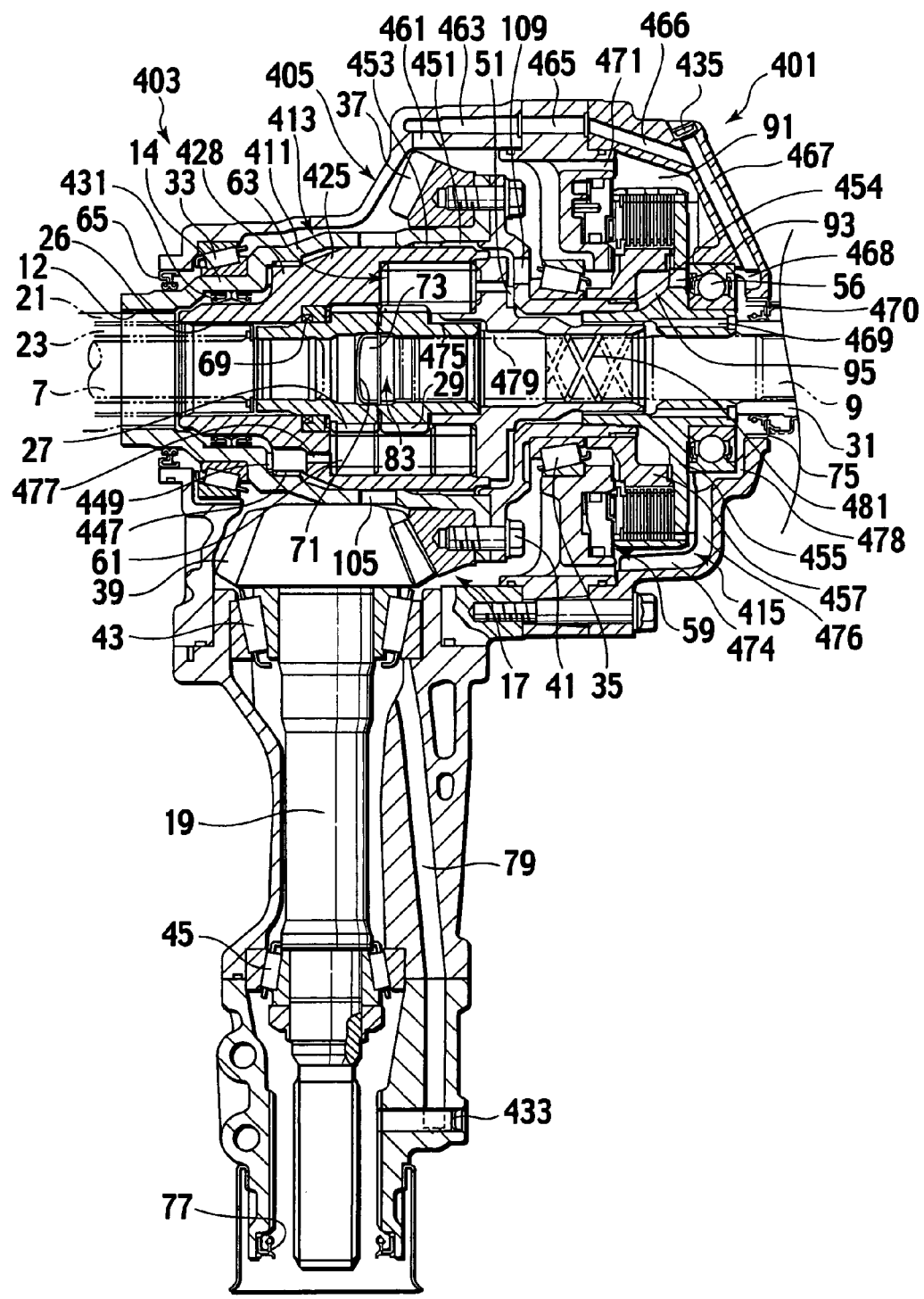
FIG. 4 is a sectional view of a transfer device having a partition structure according to a fourth embodiment of the present invention.
Figure 5:
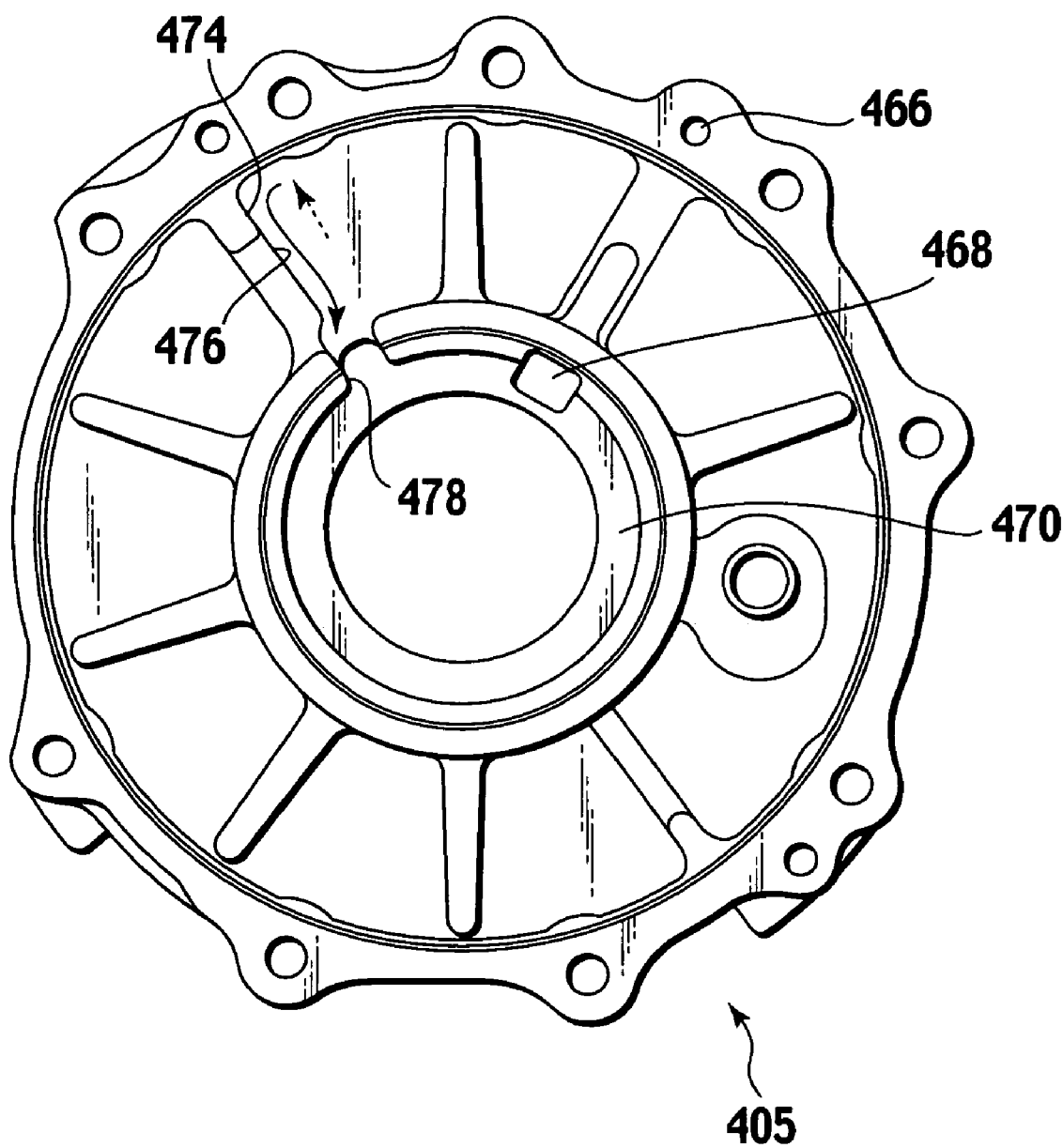
FIG. 5 is a side view of a right end part of the transfer device of the fourth embodiment, seen from the interior of the transfer device.

A fourth embodiment of the present invention will be described hereinafter with reference to FIGS. 3 and 4. In the following description, substantially the same elements as any of the aforementioned elements are referenced with the same numerals and the detailed descriptions will be omitted.

According to the fourth embodiment, a partition structure 401 is applied to a transfer 403 (as a power train device). The transfer 403 receives a driving power generated by an engine via a center differential (as a first differential) and transmits the power to the four driving wheels.

The transfer 403 is provided with a transfer case 405, an transfer case 411 (as a first rotary member) rotatably housed in the transfer case 405, a front differential 413 (as a second differential) further rotatably housed in the transfer case 411, and seal members of a seal 65, a seal 431 and an X-ring 69 for sealing oil in the transfer case 405. The transfer case 411 and the front differential 413 are coupled with the center differential through the first opening of the first end. The seal 65, the seal 431 and the X-ring 69 are disposed around the first opening of the first end of the transfer case 405.

The front differential 413 is coaxially and rotatably housed in the outer casing 411. The front differential 413 is provided with a differential case 425 (as a second rotary member) and left and right side gears 27 and 29 for differential output to left and right axles. The outer casing 411 and the differential case 425 are respectively provided with a coupling portion 12 and a coupling portion 26 (i.e. both having splined inner peripheries) for coupling with members 21 and 23 and thereby respectively receive differential output power of the center differential. The differential case 425 is rotatably supported in the inner periphery of the outer casing 411 via sliding bearings 447, 449, 453 and 51. The sliding bearings 447 and 449 are respectively disposed on a left end and an outer periphery of a boss portion 428 of the differential case 425. The sliding bearing 453 is disposed around the outer periphery of the differential case 425. Adjacent to the sliding bearing 453, a clearance between the outer casing 411 and the differential case 425 is made wider to form a contaminant reservoir 451 where contaminant contained in the oil is reserved and prevented from being caught in the sliding bearing 453.

The seal 65 is disposed between the transfer case 5 and the outer casing 411, particularly around the coupling portion 12. The seal 431 is disposed between the outer casing 411 and the differential case 425, particularly around the coupling portion 26. The X-ring 69 is disposed between the differential case 425 and the left side gear 27. As the seals 65 and 431, so-called oil seals having garter springs are preferably employed. In contrast, a usual X-ring, a type of squeeze packings, is preferably applied to the X-ring 69 since the differential case 425 may not severely rotate relative to the side gear 27. The hollow 73 of the side gear 27 is sealed with a cap 71 as seal means. Alternatively, the side gear 27 may have a partition formed in a unitary body therewith so as to close a hollow.

The seal 65, the seal 431 and the X-ring 69 are disposed with deviations from each other in the axial direction. The seal 65 is disposed substantially at the first end of the transfer case 405 and the seal 431 recedes relative to the seal 65 toward the inside of the transfer case 405. The X-ring 69 recedes relative to the seal 431 toward the inside and the cap 71 further recedes. Moreover, the coupling portions 12 and 26 and the coupling portion of the left side gear 27 are respectively disposed at inner peripheries of the seal 65, the seal 431 and the X-ring 69. Thereby, the coupling portions 12 and 26 and the coupling portion of the left side gear 27 can be disposed in a telescopic arrangement and recede toward the inside of the transfer case 25 in this order.

The partition structure 401 is provided with oil circulation paths for circulation of the oil around the transfer case 405 and the front differential 413.

A circulation duct is formed in the wall of the transfer case 405. The circulation duct is provided with an oil outflow port 461, oil circulation ducts 463, 465, 466 and 467 sealed with a seal 435, and an oil inflow port 468. The oil outflow port 461 faces to the outer periphery of the bevel gear 37 of the outer casing 411 so as to collect the oil splashed by the bevel gear 37. The oil inflow port 468 faces to the vicinity of the inner periphery of the transfer case 405. The oil circulation ducts 463, 465, 466 and 467 penetrate the wall and link the oil outflow port 461 with the oil outflow port 468.

The oil outflow port 468 links with an annular oil reservoir 470 formed at the second end of the case 405. The oil reservoir 470 is enclosed by the transfer case 405, the seal 75, the outer periphery of the joint 31, an axial end of a clutch housing 455 and the bearing 56.

The oil reservoir 470 further links with an oil flow path 469 penetrating the clutch housing 455 (as a third rotary member) of the multiple disc clutch 415 and further links with a clearance between the differential case 425 and the axle 9. Inner periphery of the differential case 425 has spiral grooves to form an oil flow path 481 and, adjacent thereto, the clearance is made wider to form an oil flow path 479. Another clearance is kept between the right side gear 29 and the differential case 425 and is an oil flow path 475, which links the oil flow path 479 and the housings for housing the pinion gears 61 and 63. The housings spatially links with the exterior of the outer casing 411 via the oil flowpaths 105, 107 and 109 similarly to the aforementioned outer casing 11 of the first embodiment. The exterior of the outer casing 411 spatially links with the space 91 via an oil flow path 471.

The circulation duct including the oil outflow port 461 and the oil circulation ducts 463, 465, 466 and 467 and oil inflow port 468, the oil reservoir 470, the oil flow paths 469, 481, 479, 475, 105, 107, 109 and 471 described above compose one of the oil circulation paths. Accompanying the rotation of the bevel gear 37, the oil enclosed in the transfer case 405 flows through the oil outflow port 461 into the oil circulation ducts 463, 465, 466 and 467 with employing the gravity force and further flows through the oil inflow port 468 to the oil reservoir 470.

The oil circulation paths further include an oil gutters 474 and 476 and an oil groove 478 formed on the inner periphery of the transfer case 405 in such a way as to link the vicinity of the outer periphery of the clutch housing 455 with the oil reservoir 470. Accompanying the rotation of the clutch housing 455, the oil is splashed to the oil gutter 474. The oil is collected by the oil gutter 474 and conducted through the oil gutters 474 and 476 and the oil groove 478 to the oil reservoir 470.

Thereby, the oil flow paths are configured to collect the oil splashed by any one of the front differential 413 and the clutch housing 455 and conduct the oil to the oil reservoir 470.

The oil sent through the above oil circulation paths flows into the oil flow path 469. The oil at the oil flow path 469 further flows through the oil flow paths 481 and 479 and partly flows into an interior of the differential case 425 and reaches the internal space 73 of the side gears 27 and 29. Another part of the oil flows through the oil flow path 475 into the housings of the pinion gears 61 and 63. Consequently the oil flows out of the oil flow paths 103 and 107 by means of the centrifugal force of the differential case 425 and further flows out of the oil flow paths 105 and 109. The oil partly flows through the oil flow path 471 to the space 91 and partly re-flows through the outflow port 461.

The transfer case 405 is further provided with an oil flow path 79 along the drive pinion shaft 19, which is configured to conduct the oil in the space 91 to a space around the pinion shaft 19 in the vicinity of the seal 77. The oil flow path 79 has a through hole opening outward formed when machining and the through hole is sealed with a seal 433.

According to the partition structure 401 of the present embodiment, the seal members of the seals 65 and 431 and X-ring 69 prevent the oil in the case from mixing with the transmission oil existing at the center differential side and are disposed to get together around the first end of the transfer case 5. Thereby, a large internal space can be assured in the transfer case 5 and hence a sufficient amount of special oil can be filled therein. This leads to increase in durability and realizes an enclosed system of the oil circulation in the transfer case.

Moreover, the partition structure 401 provides spatial separability of the power train device so that the transfer including the front differential can be separately and independently designed from the transmission including the center differential.

Meshing portions of the gears contained in the transfer 403 can be effectively lubricated by the circulating oil since the oil circulation paths are assured in such a way as to include all the meshing portions.

Further, according to the partition structure 401 of the present embodiment, the oil circulation paths respectively have centrifugal pump functions and thereby the oil is collected and conducted to necessary points.

The contents of Japanese Patent Application No. 2004-138469 (filed May 7, 2004) are incorporated herein by reference in its entirety.

Although the invention has been described above by reference to certain embodiments of the invention, the invention is not limited to the embodiments described above. Modifications and variations of the embodiments described above will occur to those skilled in the art, in light of the above teachings.

What is claimed is:

1. A partition structure of a power train device, the partition structure partitioned from an external first differential, having first and second external output gears, said partition structure comprising:
    a second differential coupled with the first differential so as to receive a driving force input to the first differential;
    a case having a first end facing to the first differential, a second end opposed to the first end and a wall defining the case, the case rotatably housing the second differential and an oil for lubrication of the second differential;
    a seal member disposed at the first end of the case and between the first differential and the second differential so as to prevent the oil in the case from mixing with an external fluid existing outside with respect to the case and the seal member;
    a first rotary member coupled with the external first output gear of the first differential,
    a second rotary member coupling the external second output gear of the first differential with an input member of the second differential, the second rotary member being disposed coaxially interior to the first rotary member; and
    an output member for output of the second differential, the output member being disposed coaxially interior to the second rotary member;
    wherein the seal member includes a first seal disposed between the case and the first rotary member, a second seal disposed between the first rotary member and the second rotary member and a third seal disposed between the second rotary member and the output member.

2. The partition structure of claim 1, wherein the output member includes a hollow and a cap sealing the hollow.

3. The partition structure of claim 1, wherein the first rotary member, the second rotary member and the output member respectively comprise a first coupling portion, a second coupling portion and a third coupling portion, and the first coupling portion, the second coupling portion and the third coupling portion are respectively disposed at inner peripheries of the first seal, the second seal and the third seal.

4. The partition structure of claim 1, wherein the first seal, the second seal and the third seal are disposed with deviations from each other in an axial direction.

5. The partition structure of claim 1, wherein the second seal recedes relative to the first seal toward an interior of the case and the third seal recedes relative to the second seal toward the interior of the case.

6. The partition structure of claim 1, wherein the first seal and the second seal are oil seals and the third seal is a squeeze packing.

7. The partition structure of claim 6, wherein the squeeze packing is an X-ring.

8. The partition structure of claim 1, further comprising:
    an oil circulation path for circulation of the oil around the case and the second differential.

9. The partition structure of claim 8, wherein the oil circulation path includes a space within the case, a clearance held radially inside of the second differential and an oil passage linking the second differential and the space.

10. The partition structure of claim 8, wherein the oil circulation path further includes an oil gutter formed on an inner periphery of the case, the oil gutter being configured to collect the oil splashed by the first rotary member or the second rotary member.

11. The partition structure of claim 8, wherein the oil circulation path further includes a circulation duct formed in the wall of the case, the circulation duct being configured to collect the oil splashed by the first rotary member or the second rotary member and linking with an inner periphery of the second end of the case.

12. The partition structure of claim 8, further comprising a third rotary member, wherein the oil circulation path includes an oil gutter formed on an inner periphery of the case, the oil gutter being configured to collect the oil splashed by any one of the first rotary member, the second rotary member and the third rotary member.

13. The partition structure of claim 12, wherein the oil circulation path further includes a circulation duct formed in the wall of the case, the circulation duct being configured to collect the oil splashed by any one of the first rotary member, the second rotary member and the third rotary member and linking with an inner periphery of the second end of the case.

14. The partition structure of claim 1, further comprising:
    an oil circulation path for circulation of the oil around the case and the second differential.

15. The partition structure of claim 1, further comprising:
    an oil gutter formed on an inner periphery of the case, the oil gutter being configured to collect the oil splashed by the second differential.

16. The partition structure of claim 1, further comprising:
    a circulation duct formed in the wall of the case, the circulation duct being configured to collect the oil splashed by the second differential.

* * * * *